(12) United States Patent
Williams et al.

(10) Patent No.: US 7,441,292 B2
(45) Date of Patent: Oct. 28, 2008

(54) TRAVEL PILLOW

(76) Inventors: Pamela Williams, 2738 Northgate Way, Acworth, GA (US) 30101; Darrio H. Williams, 2738 Northgate Way, Acworth, GA (US) 30101

( * ) Notice: Subject to any disclaimer, the term of this patent is extended or adjusted under 35 U.S.C. 154(b) by 0 days.

(21) Appl. No.: 11/747,805

(22) Filed: May 11, 2007

(65) Prior Publication Data

US 2007/0261171 A1 Nov. 15, 2007

Related U.S. Application Data

(63) Continuation-in-part of application No. 11/383,158, filed on May 12, 2006.

(51) Int. Cl.
*A47G 9/10* (2006.01)
(52) U.S. Cl. .................. 5/636; 5/640; 5/645; 5/490; 297/397
(58) Field of Classification Search .................. 5/636, 5/639, 640, 644, 645, 490; 297/393, 395, 297/397
See application file for complete search history.

(56) References Cited

U.S. PATENT DOCUMENTS

| | | | | |
|---|---|---|---|---|
| 3,148,389 | A * | 9/1964 | Lustig | ............... 5/645 |
| 3,220,770 | A | 11/1965 | Schaeffer | |
| 3,851,919 | A | 12/1974 | Nagy | |
| 4,277,859 | A * | 7/1981 | Seaman | ............... 5/639 |
| 4,770,466 | A | 9/1988 | Pesterfield | |
| 4,802,691 | A | 2/1989 | Watkins | |
| 4,919,483 | A | 4/1990 | Horkey | |
| 4,951,998 | A | 8/1990 | McClain | |
| 4,967,429 | A | 11/1990 | Vlad | |
| 4,985,950 | A | 1/1991 | Gladish | |
| 5,054,855 | A | 10/1991 | Williams et al. | |
| 5,140,713 | A | 8/1992 | Pesterfield | |
| 5,317,772 | A | 6/1994 | Perl et al. | |
| 5,395,159 | A | 3/1995 | Pinto | |
| 5,404,600 | A * | 4/1995 | DeMars | ............... 5/413 R |
| 5,800,018 | A | 9/1998 | Colombo et al. | |
| 5,918,332 | A * | 7/1999 | Dees | ............... 5/639 |
| 6,135,560 | A | 10/2000 | Fagg | |
| 6,644,475 | B2 * | 11/2003 | Wilson et al. | ............... 206/522 |
| 6,748,615 | B1 * | 6/2004 | Tiedemann | ............... 5/640 |
| 6,807,697 | B2 * | 10/2004 | Druery et al. | ............... 5/650 |
| 7,322,057 | B2 * | 1/2008 | Merlini | ............... 5/490 |
| 2001/0042272 | A1 | 11/2001 | Kontos | |
| 2005/0173962 | A1 | 8/2005 | Stein et al. | |

* cited by examiner

*Primary Examiner*—Michael Trettel
(74) *Attorney, Agent, or Firm*—Advantia Law Group; Michael W. Starkweather; Jason P. Webb

(57) ABSTRACT

A pillow for coupling to a surface. The pillow includes: a first cushion; a first cover enclosing the first cushion; a second cover enclosing the first cover, the second cover including: a first end, having a first corner; a second end, disposed opposite the first end, having a second corner; and a first aperture disposed near the first corner; wherein the first aperture is large enough to permit ingress and egress of the first cushion therethrough; and an elongated band member, coupled to the first end and the second end, respectively, thereby forming an opening between the elongated band member and the second cover. The pillow further includes: a loop member, coupled to the second end; a carrying strap member coupled to the first corner and the second corner, respectively; a pair of D-rings, each D-ring coupled to the first corner and the second corner, respectively; and a slide fastener.

16 Claims, 2 Drawing Sheets

TRAVEL PILLOW

CROSS-REFERENCE TO RELATED APPLICATIONS

This invention claims priority, under 35 U.S.C. § 120, to U.S. Non-Provisional patent application Ser. No. 11/383,158, to Williams et al., filed on May 12, 2006, which is incorporated by reference herein.

BACKGROUND OF THE INVENTION

1. Field of the Invention

The present invention relates to pillows, specifically to travel pillows.

2. Description of the Related Art

Travel is notoriously uncomfortable. Makers of vehicles must balance a great variety of needs when designing a vehicle, and therefore comfort is often sacrificed for economy, space, safety, etc. Accordingly, efforts have been made at making traveling more comfortable. Such efforts include chairs/seats configured with comfort features such as reclining mechanisms, headrests, heat elements, vibration elements, etc.

However, seats generally only provide a limited number of comfortable positions for a user. Accordingly, efforts have been made at creating comfort accessories to enhance passenger comfort in vehicles. The following are examples of such and are hereby incorporated by reference herein:

U.S. Pat. No. 5,800,018 by Colombo, et al. discloses a pillow is attachable to the window of an automobile or other vehicle via one or more suction cups. The pillow comprises a cushion portion consisting of foam rubber or other soft, resilient material, a fabric cover for the cushion that may be removable, a vertical back portion to which one or more suction cups are attached and which comprises a nonskid material on the side that faces the vehicle window to minimize vertical and horizontal slippage of the pillow when in use.

U.S. Pat. No. 4,919,483 by Horkey, indicates a headrest for securing to the window in the cab of a truck, or to any supporting surface in other types of vehicles, employing a cushion of porous plastic material surrounded by a nonporous material. The cushion has a port extending through the casing and into the porous material. A valve is mounted on the casing to control air flow through the port upon head impact with the cushion and substantially closing the port upon inflow of air through the port and into the cushion after impact. Means are mounted on the cushion for affixing it t the window of the cab of the truck or other surfaces in other types of vehicles.

U.S. Pat. No. 5,317,772 by Perl, et al. references an inflatable pillow having fastening strips along one edge thereof is attachable to an external structure to enable easy attachment of the pillow to the structure, followed by inflation, and use by a user. Suction cups may also be provided along the pillow edge for attachment to a vertical glass window.

U.S. Pat. No. 5,054,855 by Williams, et al. discloses a headrest which is mounted to the inside rear window of a vehicle by attached suction cups which permit the headrest to be mounted, positioned, released and repositioned to the vehicle window adjacently behind the vehicle seats.

U.S. Pat. No. 4,770,466 by Pesterfield references a headrest includes recessed suction cups for detachably attaching the headrest to a support surface to substantially prevent the headrest from sagging away from the surface, and limit relative movement between the headrest and the surface.

While such efforts have been made in making pillow-type devices, many fail to provide compact/compactable pillows, easily transportable pillows, pillows that may be adjusted for use, pillows that advantageously dangle pillows resistant to damage from coupling members, and/or modular systems. Further, many such devices are expensive, bulky, and/or cumbersome; leaving large unsightly marks on windows; and/or include many parts. Further, many are difficult to clean and/or are unsanitary.

What is needed is a pillow that solves one or more of the problems described herein and/or one or more problems that may come to the attention of one skilled in the art upon becoming familiar with this specification.

SUMMARY OF THE INVENTION

The present invention has been developed in response to the present state of the art, and in particular, in response to the problems and needs in the art that have not yet been fully solved by currently available travel pillows. Accordingly, the present invention has been developed to provide a travel pillow.

In one embodiment of the invention there may be a pillow for coupling to a surface that may include: a first cushion of soft resilient material; a first cover enclosing the first cushion; a second cover enclosing the first cover, the second cover including: a first end, having a first corner; a second end, which may be disposed opposite the first end, having a second corner; and/or a first aperture which may be disposed near the first corner; and/or an elongated band member, coupled to the first end and/or the second end, respectively, thereby forming an opening between the elongated band member and/or the second cover. The first aperture may be large enough to permit ingress and/or egress of the first cushion therethrough.

In another embodiment of the invention, the pillow may include a loop member, coupled to the second end. In still another embodiment of the invention, the loop member may be coupled to the elongated band member. In yet another embodiment of the invention, the elongated band member and/or the loop member may be elastic.

In still yet another embodiment of the invention, the pillow may include a carrying strap member coupled to the first corner and/or the second corner, respectively. In even another embodiment of the invention, the carrying strap member may be coupled to the first corner and/or the second corner by a pair of D-rings, each D-ring coupled to the first corner and/or the second corner, respectively. In a further embodiment of the invention, the first aperture may include a closing mechanism configured to close the first aperture. In still a further embodiment of the invention, the closing mechanism may include a slide fastener. In yet a further embodiment of the invention, the second cover may include a second aperture which may be disposed therethrough; and/or the first cover may include a suction cup coupled to the first cover and/or which may be disposed through the second aperture.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order for the advantages of the invention to be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
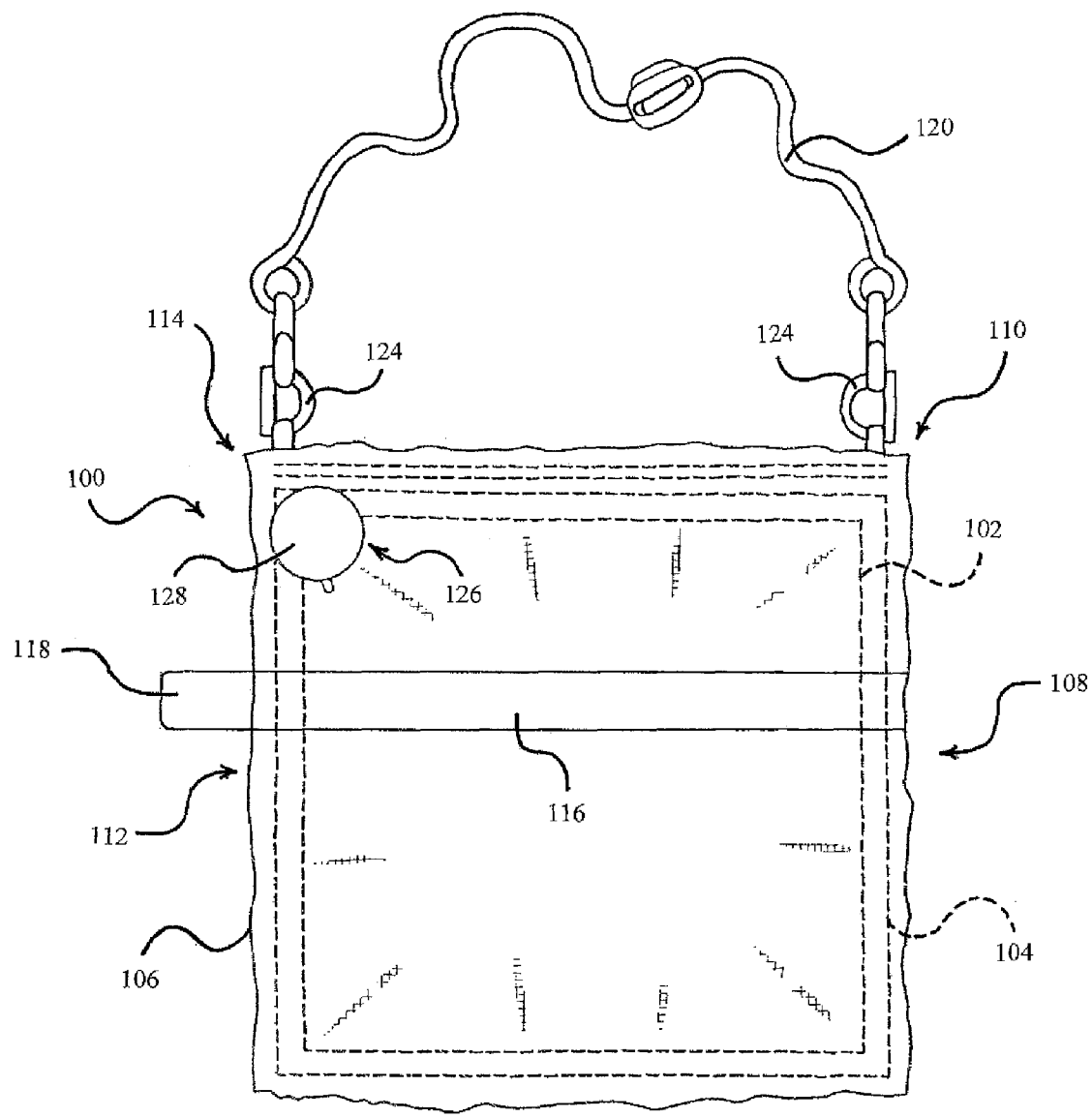
FIG. 1 is a front elevational view of a pillow, according to one embodiment of the invention.

For the purposes of promoting an understanding of the principles of the invention, reference will now be made to the exemplary embodiments illustrated in the drawings, and specific language will be used to describe the same. It will nevertheless be understood that no limitation of the scope of the invention is thereby intended. Any alterations and further modifications of the inventive features illustrated herein, and any additional applications of the principles of the invention as illustrated herein, which would occur to one skilled in the relevant art and having possession of this disclosure, are to be considered within the scope of the invention.

Reference throughout this specification to "one embodiment," "an embodiment," or similar language means that a particular feature, structure, or characteristic described in connection with the embodiment is included in at least one embodiment of the present invention. Thus, appearances of the phrases "one embodiment," "an embodiment," and similar language throughout this specification may, but do not necessarily, all refer to the same embodiment, different embodiments, or component parts of the same or different illustrated invention. Additionally, reference to the wording "an embodiment," or the like, for two or more features, elements, etc. does not mean that the features are related, dissimilar, the same, etc. The use of the term "an embodiment," or similar wording, is merely a convenient phrase to indicate optional features, which may or may not be part of the invention as claimed.

Each statement of an embodiment is to be considered independent of any other statement of an embodiment despite any use of similar or identical language characterizing each embodiment. Therefore, where one embodiment is identified as "another embodiment," the identified embodiment is independent of any other embodiments characterized by the language "another embodiment." The independent embodiments are considered to be able to be combined in whole or in part one with another as the claims and/or art may direct, either directly or indirectly, implicitly or explicitly.

Finally, the fact that the wording "an embodiment," or the like, does not appear at the beginning of every sentence in the specification, such as is the practice of some practitioners, is merely a convenience for the reader's clarity. However, it is the intention of this application to incorporate by reference the phrasing "an embodiment," and the like, at the beginning of every sentence herein where logically possible and appropriate.

Figure 2:
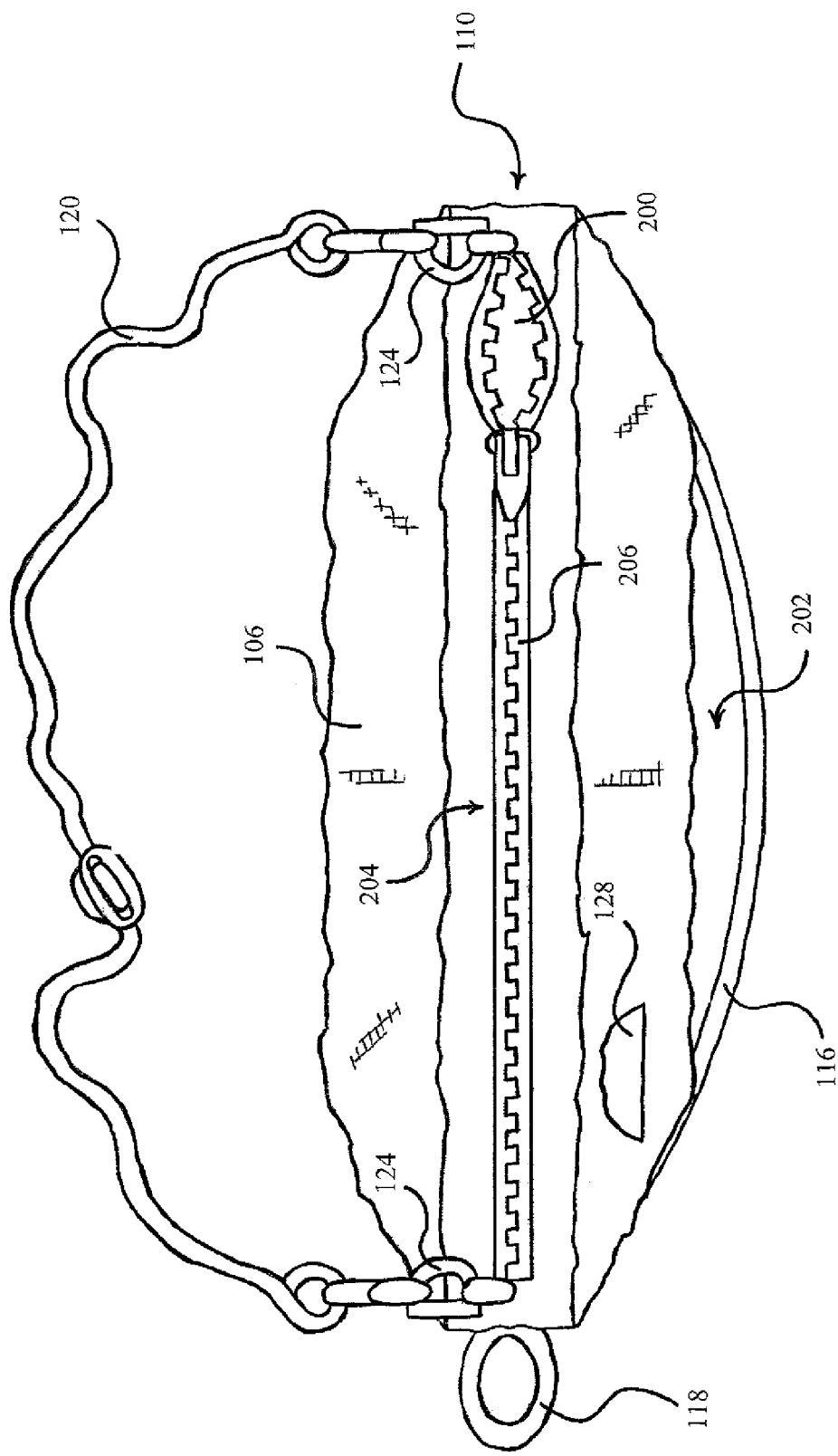
FIG. 2 is a top plan view of a pillow, according to one embodiment of the invention.

FIGS. 1 and 2 illustrate a pillow 100 for coupling to a surface. As shown, the pillow 100 includes a first cushion 102, a first cover 104 enclosing the first cushion 102, and a second cover 106 enclosing the first cover 104. In one embodiment of the invention, the first cushion 102 is a soft resilient material. Accordingly, the illustrated first cushion 102 is configured to provide comfort and/or support to a user thereof. For example, the first cushion 102 may be constructed of any materials appreciated in the art, such as, but not limited to: foam, cotton, batting, woven materials, feathers, down, synthetic down, chips, beads, beans, and/or rubber.

Similarly, the first cover 104 and the second cover 106 may be constructed of any material appreciated in the art, for protecting the pillow 100 and providing comfort and support, such as but not limited to: woven materials, cotton, polyester, fleece, plastic, rubber, and/or wool. In one embodiment, the second cover 106 is an envelope of soft woven material of a pleasant color and has a substantially square profile. Likewise, one skilled in the art would appreciate that the pillow 100 may have any shape appreciated in the art, such as, but not limited to: rectangular, square, round, oblong, pyramidal, pentagonal, and/or triangular. Moreover, the second cover 106 may include ornamentation, such as but not limited to embroidery, logos, printing, etc.

Further, the second cover 106 includes a first end 108 with a first corner 110, a second end 112 with a second corner 114, and a first aperture 200 disposed near the first corner 110. As illustrated, the first aperture 200 is sized large enough to permit ingress and egress of the first cushion 102 therethrough. Advantageously, the first cushion 102 and the first cover 104 may be removed from the second cover 106 for washing the second cover 106 and replacing the first cushion 102 for more or less support. More, one skilled in the art would appreciate that the first aperture 200 may have any size large enough to permit ingress and egress of the first cushion therethrough, and still perform its intended function. Furthermore, one skilled in the art would appreciate that the first aperture 200 may be disposed anywhere along the second cover 106. For example, the first aperture 200 may be disposed near the second corner 114 and/or between the first corner 110 and the second corner 114.

Also illustrated by FIGS. 1 and 2, the pillow 100 includes an elongated band member 116. As shown, the band member 116 is coupled to the first end 108 and the second end 112 thereby forming an opening 202 between the elongated band member 116 and the second cover 106. Advantageously, a seat back, a head rest, an arm rest, or another object may be inserted through the opening 202 for support of the pillow 100 and comfort. In addition, the illustrated pillow 100 includes a loop member 118 coupled to the second end 112. Advantageously, the loop member 118 provides easy carrying of the pillow 100. For example, a carabineer, or other hook, is easily slipped through the loop member 118, and the pillow 100 may be attached to belt loops, backpacks, briefcases, and any other object thereby.

In one embodiment of the invention, the loop member 118 is coupled to the elongated band member 116. Moreover, one skilled in the art would appreciate that the loop member 118 and the elongated band member 116 may be one continuous member separated into two members by a divider, such as by stitching, tape, or any other divider appreciated in the art and still perform its intended function. In another embodiment of the invention the elongated band member 116 and the loop member 118 are elastic. Advantageously the elongated band member 116 and the loop member 118 may be stretched over various objects for carrying and/or supporting the pillow 100.

As a result, one skilled in the art would appreciate that the elongated band member 116 and the loop member 118 may have any shape and/or size appreciated in art, and/or may be coupled to the second cover 106 at any area of the second cover appreciated in the art and still perform its intended function. For example, the elongated band member 116 and the loop member 118 may have a width of 0.5, 1, 2, or 3 inches. Also, the elongated band member may have a length equal to, or less than a width of the pillow 100, such as 10, 12, 14, or 16 inches. Likewise, the loop member 118 may have a length of 0.5, 1, 2, 3, or 4 inches.

As illustrated by FIGS. 1 and 2, the pillow 100 also includes a carrying strap member 120 coupled to the first corner 110 and the second corner 114. In one embodiment of the invention, the carrying strap member 120 is coupled to the first corner 110 and the second corner 114 of the second cover 106 by a pair of D-rings 124. As shown, the D-rings 124 are permanently coupled to the second cover 106. However, one skilled in the art would appreciate that the carrying strap member 120 may be coupled to the second cover 106 by any coupling mechanism appreciated in the art, such as, but not limited to: hooks, snaps, hook and loop, stitches, clips, spring clips, and/or ties. Advantageously, the carrying strap member 120 may be removed from the second cover 106 for providing additional comfort, reducing bulkiness, and/or for preventing the pillow 100 and/or carrying strap member 120 from becoming snagged or otherwise damaged. More, one skilled in the art would appreciate that the carrying strap member may be coupled to the second cover 106 at any area of the second cover 106 appreciated in the art and still perform its intended function.

One skilled in the art would also appreciate that a length of the carrying strap member 120 may be adjustable. For example, the carrying strap member may include an adjustable double locking tab with a two cord stop for adjusting a length of the carrying strap member 120. Accordingly, one skilled in the art would appreciate that the carrying strap member 120 may have any length appreciated in the art. For example, the carrying strap member 120 may have a length, such as, but not limited to, 24 30, 36, 44, and 48 inches.

As shown, the pillow 100 further includes a closing mechanism 204 configured to close the first aperture 200. In one embodiment of the invention, the closing mechanism 204 is a slide fastener 206, such as a zipper. However, one skilled in the art would appreciate that the closing mechanism 204 may be any mechanism configured to close the first aperture 200. For example, one skilled in the art would appreciate that the closing mechanism 204 may include: hook and loop, snaps, ties, hooks, and/or clips.

In addition, the second cover 106 of the illustrated pillow 100 includes a second aperture 126 disposed therethrough. Further, the first cover 104 has a suction cup 128 coupled to the first cover 104 and disposed through the second aperture 126. In one embodiment of the invention, the suction cup 128 may be such as, but not limited to the suctions cups of Anver Corp. of Hudson, Mass. Advantageously, the pillow 100 may be coupled to a surface by the suction cup 128, thereby enabling the pillow 100 to be positioned in a plurality of comfortable configurations. For example, the suction cup 128 may couple to surfaces, such as, but not limited to: glass, finished wood, plastic, smooth metal, and lacquer covered materials. Also shown, the suction cup 128 is coupled near and edge of the pillow 100. Accordingly, the pillow 100 may dangle and may be moved by pivoting about the suction cup 128. Additionally, the pillow 100 may be rolled for increasing cushion material and comfort.

In operation of one embodiment of the invention, a user carries a pillow 100 by a loop member 118, or by a carrying strap member 120. Once the user is no longer carrying the pillow 100, the user couples the pillow 100 to a surface for rest, comfort, and/or support. The user may couple the pillow to a surface 100 by placing an elongated band member 116 of the pillow over a surface, such as a head rest, or by attaching the pillow 100 to a surface, such as a window, with a suction cup 128 of the pillow 100. After the user has used the pillow 100, the user may remove the first cushion 102 and or the first cover 104 from the second cover 106 for washing the first cushion 102, the first cover 104, and/or the second cover 106, and/or for replacing the first cushion 102, the first cover 104, and/or the second cover 106.

It is understood that the above-described embodiments are only illustrative of the application of the principles of the present invention. The present invention may be embodied in other specific forms without departing from its spirit or essential characteristics. The described embodiment is to be considered in all respects only as illustrative and not restrictive. The scope of the invention is, therefore, indicated by the appended claim rather than by the foregoing description. All changes which come within the meaning and range of equivalency of the claims are to be embraced within their scope.

For example, although the figures illustrate a pillow 100 with a rectangular profile, one skilled in the art would understand that the appropriate shapes for fulfilling the desired function are plethoric, and include shapes such as, but not limited to, circles, ellipses, triangles, other polygons, irregular shapes, and combinations thereof. Additionally, although the figures illustrate only a single suction cup 128, it is understood that the pillow 100 may include more than one suction cup 128.

It is also envisioned that there could be numerous variations of the design of this invention. For example, the first aperture 200, the elongated band member 116, the loop member 118, the carrying strap member 120, and the suction cup 128 could be disposed anywhere along the second cover 106 and still perform their intended function for the pillow 100.

Finally, it is envisioned that the components of the device may be constructed of a variety of materials. For example the pillow 100 may be constructed of materials such as, but not limited to: plastic, metal, woven materials, foam, fleece, wool, down, cotton, batting, feathers, synthetic down, chips, beads, beans, polyester, and/or rubber.

Thus, while the present invention has been fully described above with particularity and detail in connection with what is presently deemed to be the most practical and preferred embodiment of the invention, it will be apparent to those of ordinary skill in the art that numerous modifications, including, but not limited to, variations in size, materials, shape, form, function and manner of operation, assembly and use may be made, without departing from the principles and concepts of the invention as set forth in the claims.

What is claimed is:
1. A pillow for coupling to a surface, comprising:
    a first cushion of soft resilient material;
    a first cover enclosing the first cushion;
    a second cover enclosing the first cover, the second cover including:
        a first end, having a first corner;

a second end, disposed opposite the first end, having a second corner;

a loop member, coupled to the second end, wherein the loop member is coupled to the elongated band member; and a first aperture disposed near the first corner; wherein the first aperture is large enough to permit ingress and egress of the first cushion therethrough; and an elongated band member, coupled to the first end and the second end, respectively, thereby forming an opening between the elongated band member and the second cover.

2. The pillow of claim 1, wherein the elongated band member and the loop member are elastic.

3. The pillow of claim 1, further comprising a carrying strap member coupled to the first corner and the second corner, respectively.

4. The pillow of claim 3, wherein the carrying strap member is coupled to the first corner and the second corner by a pair of D-rings, each D-ring coupled to the first corner and the second corner, respectively.

5. The pillow of claim 1, wherein the first aperture comprises a closing mechanism configured to close the first aperture.

6. The pillow of claim 5, wherein the closing mechanism comprises a slide fastener.

7. The pillow of claim 1, wherein the second cover comprises a second aperture disposed therethrough; and the first cover comprises a suction cup coupled to the first cover and disposed through the second aperture.

8. A pillow for coupling to a surface, comprising:

a first cushion of soft resilient material;

a first cover enclosing the first cushion;

a second cover enclosing the first cover, the second cover including:

a first end, having a first corner;

a second end, disposed opposite the first end, having a second corner; and a first aperture disposed near the first corner; wherein the first aperture is large enough to permit ingress and egress of the first cushion therethrough;

an elongated elastic band member, coupled to the first end and the second end, respectively, thereby forming an opening between the elongated band member and the second cover; and an elastic loop member, coupled to the second end and to the elongated elastic band member.

9. The pillow of claim 8, further comprising a carrying strap member coupled to the first corner and the second corner, respectively.

10. The pillow of claim 9, wherein the first aperture comprises a closing mechanism configured to close the first aperture.

11. The pillow of claim 10, wherein the second cover comprises a second aperture disposed therethrough; and the first cover comprises a suction cup coupled to the first cover and disposed through the second aperture.

12. The pillow of claim 11, wherein the closing mechanism comprises a slide fastener.

13. The pillow of claim 12, wherein the carrying strap member is coupled to the first corner and the second corner by a pair of D-rings, each D-ring coupled to the first corner and the second corner, respectively.

14. A pillow for coupling to a surface, consisting essentially of:

a first cushion of soft resilient material;

a first cover enclosing the first cushion;

a second cover enclosing the first cover, the second cover including:

a first end, having a first corner;

a second end, disposed opposite the first end, having a second corner; and a first aperture disposed near the first corner; wherein the first aperture is large enough to permit ingress and egress of the first cushion therethrough; and a second aperture disposed therethrough;

an elongated elastic band member, coupled to the first end and the second end, respectively, thereby forming an opening between the elongated band member and the second cover;

an elastic loop member, coupled to the second end and to the elongated elastic band member;

a carrying strap member coupled to the first corner and the second corner, respectively;

a closing mechanism, coupled to the first configured to close the first aperture; and a suction cup coupled to the first cover and disposed through the second aperture.

15. The pillow of claim 14, wherein the closing mechanism comprises a slide fastener.

16. The pillow of claim 15, wherein the carrying strap member is coupled to the first corner and the second corner by a pair of D-rings, each D-ring coupled to the first corner and the second corner, respectively.

* * * * *